April 24, 1951  G. W. WILLARD  2,549,872
FOCUSING ULTRASONIC RADIATOR
Filed March 26, 1948  12 Sheets-Sheet 1
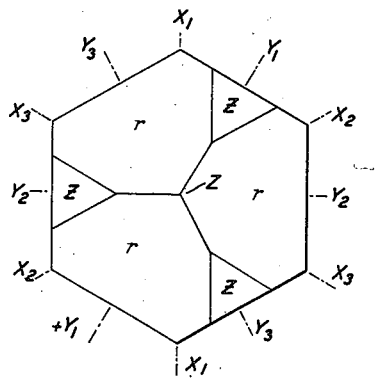
FIG. 1
FIG. 2
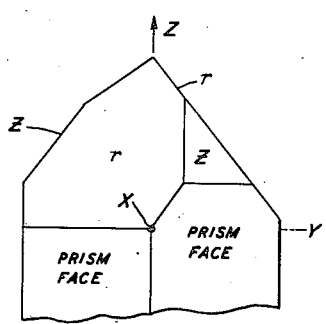
FIG. 3
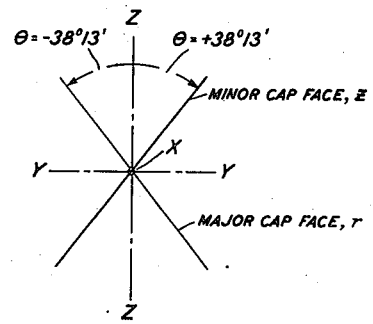
FIG. 4
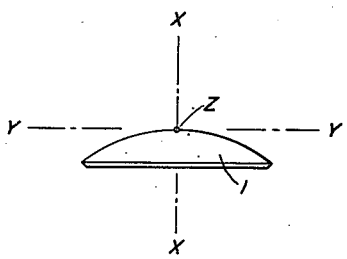
FIG. 5
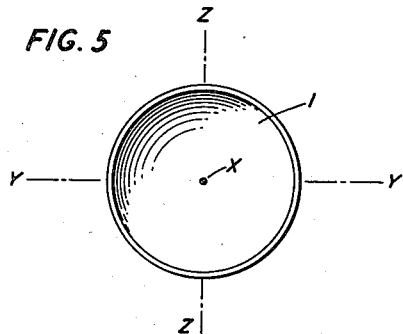
INVENTOR
G. W. WILLARD
BY
Franklin Mohr
ATTORNEY April 24, 1951 — G. W. WILLARD — 2,549,872
FOCUSING ULTRASONIC RADIATOR
Filed March 26, 1948 — 12 Sheets-Sheet 2

INVENTOR
G. W. WILLARD
BY Franklin Mohr
ATTORNEY

April 24, 1951   G. W. WILLARD   2,549,872
FOCUSING ULTRASONIC RADIATOR
Filed March 26, 1948   12 Sheets-Sheet 3
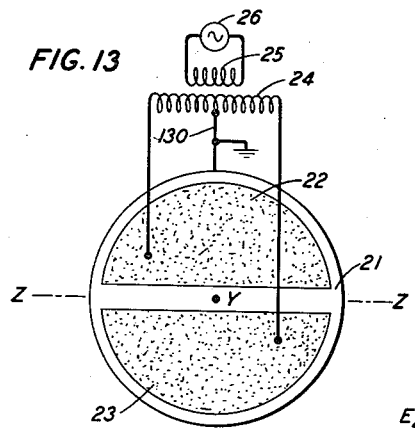
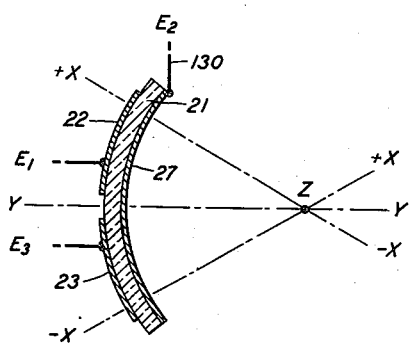
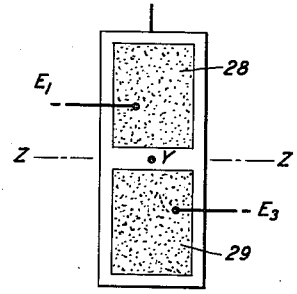
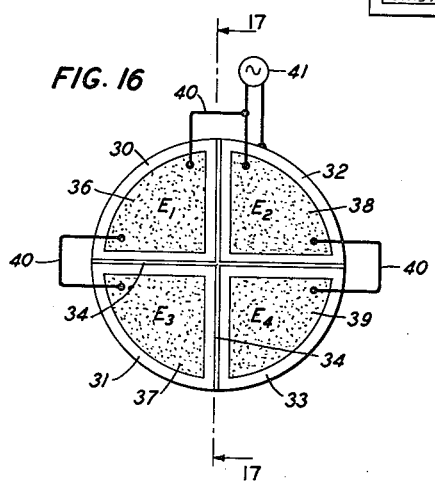
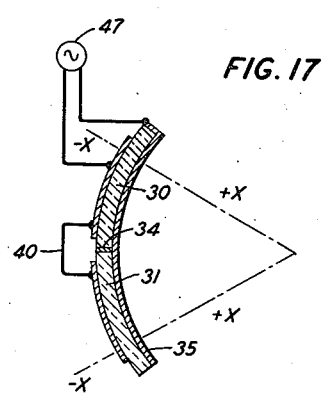
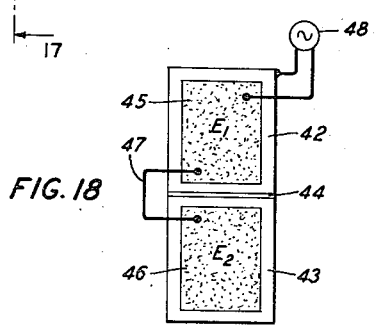
INVENTOR
G. W. WILLARD
BY
Franklin Mohr
ATTORNEY April 24, 1951  G. W. WILLARD  2,549,872
FOCUSING ULTRASONIC RADIATOR
Filed March 26, 1948  12 Sheets-Sheet 4

INVENTOR
G. W. WILLARD
BY
Franklin Mohr
ATTORNEY

April 24, 1951   G. W. WILLARD   2,549,872
FOCUSING ULTRASONIC RADIATOR
Filed March 26, 1948   12 Sheets-Sheet 5

INVENTOR
G. W. WILLARD
BY
Franklin Mohr
ATTORNEY

April 24, 1951  G. W. WILLARD  2,549,872
FOCUSING ULTRASONIC RADIATOR
Filed March 26, 1948  12 Sheets-Sheet 6

INVENTOR
G. W. WILLARD
BY
Franklin Mohr
ATTORNEY

April 24, 1951  G. W. WILLARD  2,549,872
FOCUSING ULTRASONIC RADIATOR
Filed March 26, 1948  12 Sheets-Sheet 7
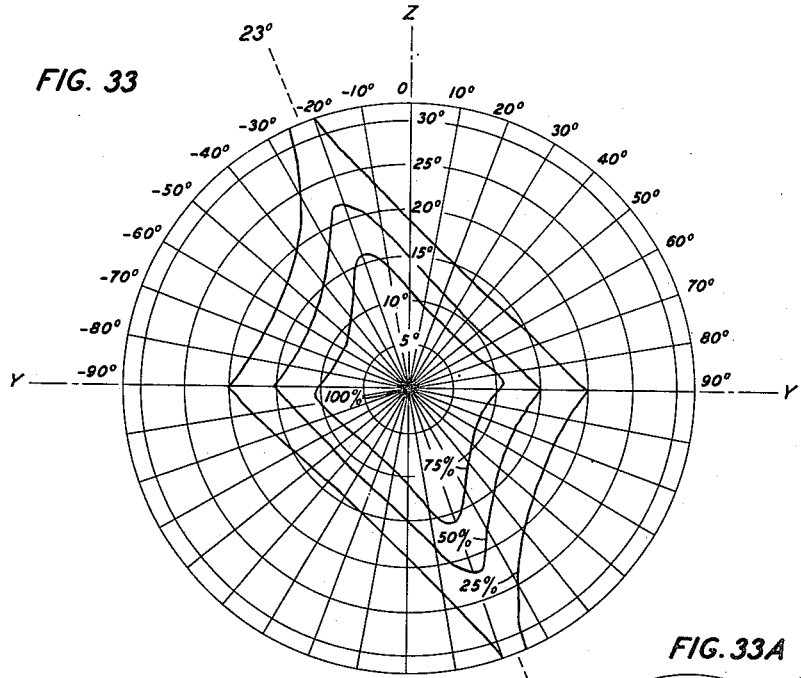
FIG. 33
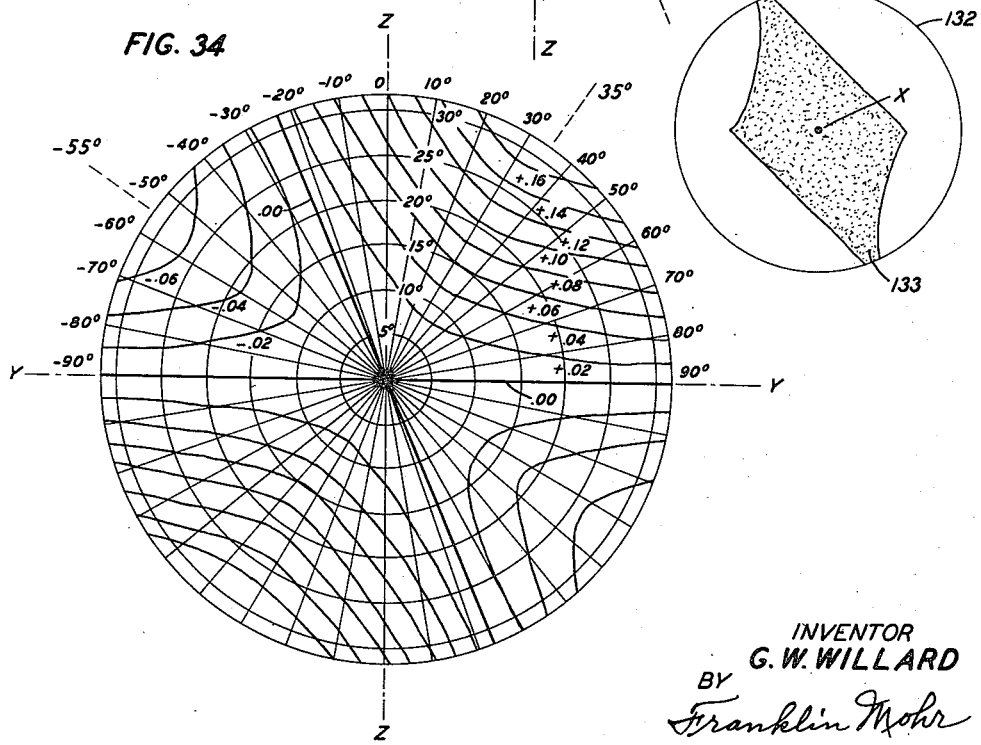
FIG. 33A
FIG. 34
INVENTOR
G. W. WILLARD
BY
Franklin Mohr
ATTORNEY

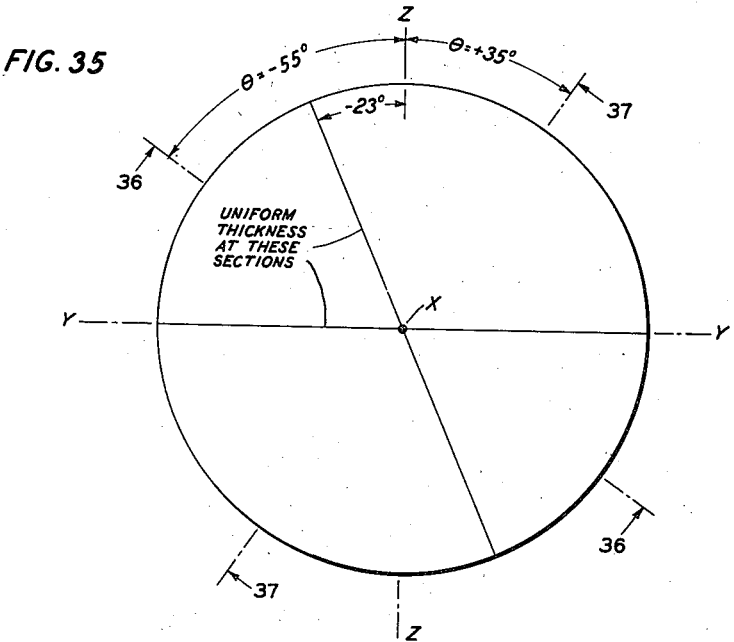
FIG. 35
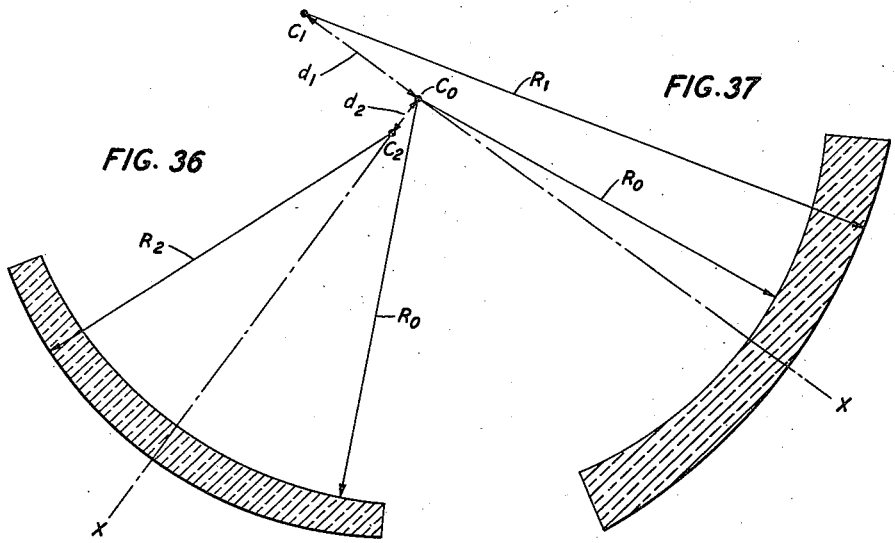
FIG. 36
FIG. 37

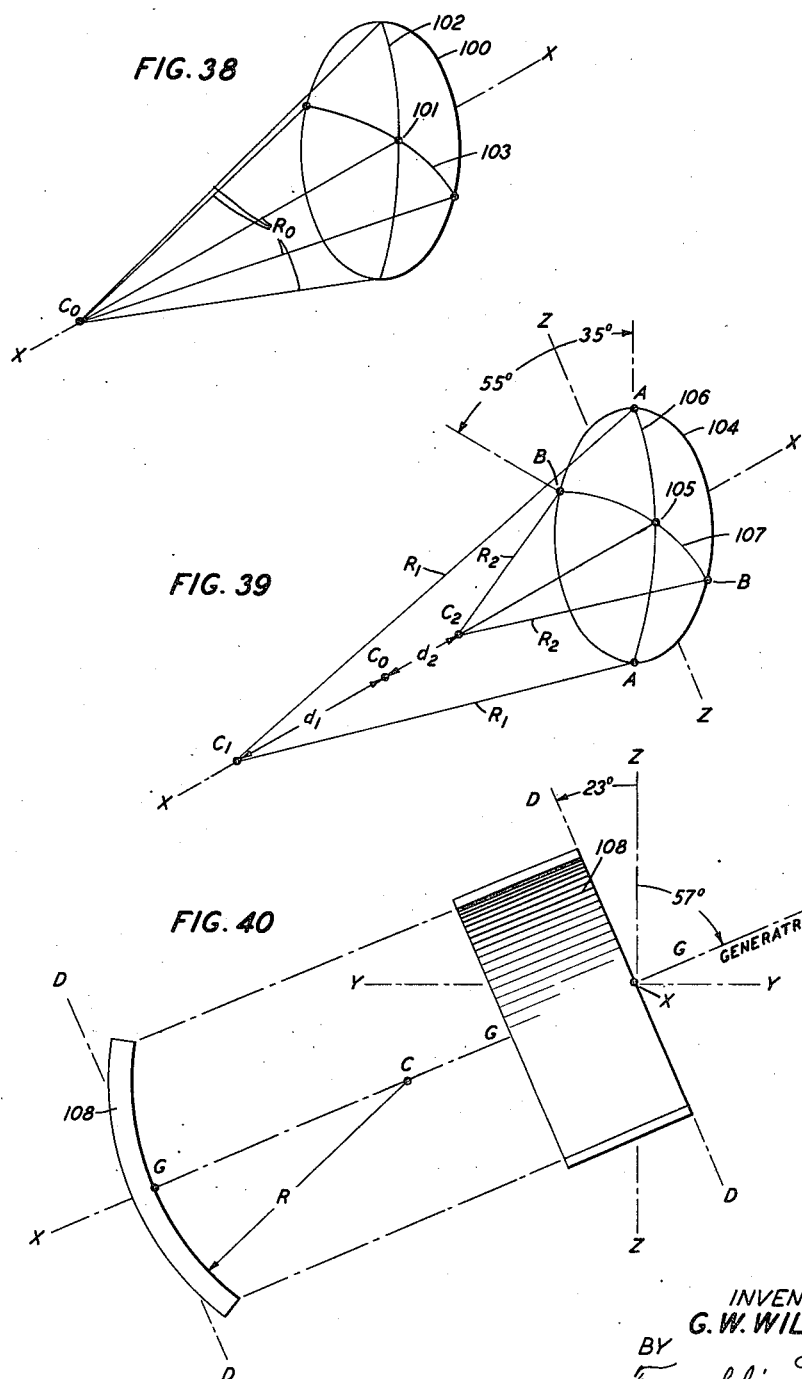

April 24, 1951 G. W. WILLARD 2,549,872
FOCUSING ULTRASONIC RADIATOR
Filed March 26, 1948 12 Sheets-Sheet 10

INVENTOR
G. W. WILLARD
BY
Franklin Mohr
ATTORNEY

April 24, 1951   G. W. WILLARD   2,549,872
FOCUSING ULTRASONIC RADIATOR
Filed March 26, 1948   12 Sheets-Sheet 11

INVENTOR
G. W. WILLARD
BY
Franklin Mohr
ATTORNEY

April 24, 1951     G. W. WILLARD     2,549,872
FOCUSING ULTRASONIC RADIATOR
Filed March 26, 1948     12 Sheets-Sheet 12
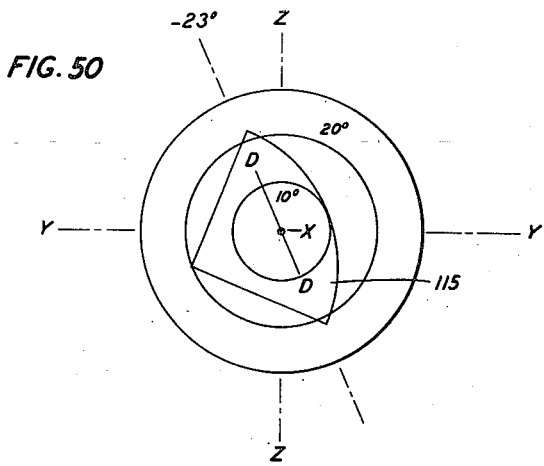
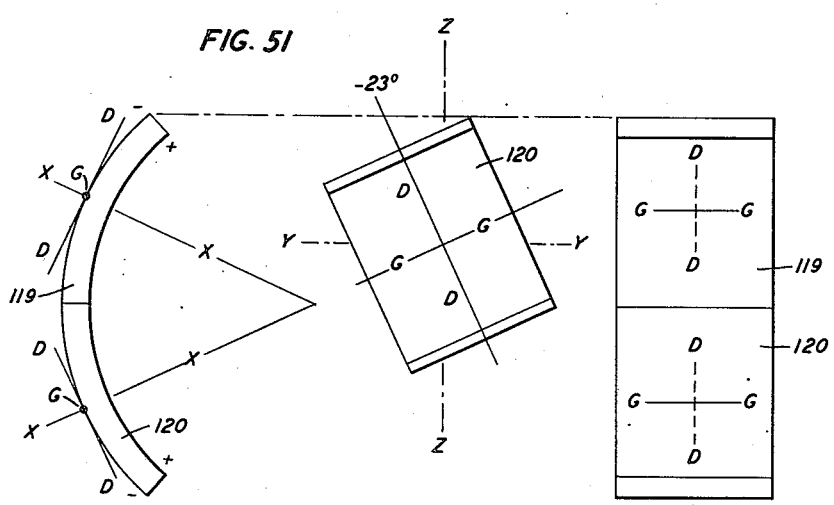
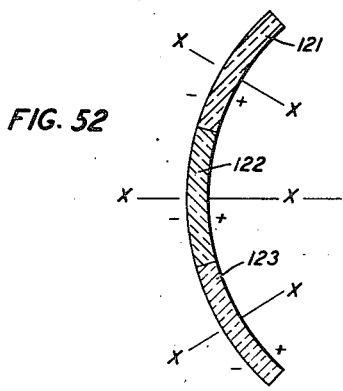
*INVENTOR*
*G. W. WILLARD*
BY
Franklin Mohr
ATTORNEY Patented Apr. 24, 1951

2,549,872

UNITED STATES PATENT OFFICE 2,549,872

FOCUSING ULTRASONIC RADIATOR

Gerald W. Willard, Fanwood, N. J., assignor to Bell Telephone Laboratories, Incorporated, New York, N. Y., a corporation of New York Application March 26, 1948, Serial No. 17,272

10 Claims. (Cl. 171—327)

This invention relates to radiators of compressional, e. g. sound, wave energy, especially ultrasonic, and more particularly to curved surface piezoelectric radiators for focusing ultrasonic wave energy in a restricted region.

It will be evident that structures that are useful as radiators are also adaptable or directly useful as pick-up devices, receivers or reflectors for gathering and focusing sound wave energy and for translating sound waves into electric currents or electromagnetic waves. Accordingly, the invention is applicable to devices for the generation, reception, or translation of sound wave energy.

Spherically-shaped piezoelectric quartz radiators have been proposed heretofore for producing focused ultrasonic waves. The object was to obtain, by concentration of the beam from the whole radiator surface into a small locality, higher ultrasonic intensities than could be obtained from plane radiators without danger of fracturing the radiators. Such spherical radiators were to be cut in the form of spherical shells, that is, to be shaped like a concavo-convex lens with spherical surfaces, the convex surface having a radius of curvature equal to the sum of the radius of curvature of the concave surface plus the uniform thickness of the shell, the periphery of the lens being circular. The orientation of the lens relative to the crystallographic axes of the mother crystal was in one case such that the axis of the lens was parallel to an electric (X) axis of the quartz. In another case the lens axis was made parallel to a Y-axis of the mother crystal. Analogously to the naming used with ordinary flat quartz plate radiators, the above two radiators may be called respectively X-cut and Y-cut focusing radiators, as their major surfaces at the points cut by their axes of symmetry are respectively normal to the X and Y crystallographic axes.

The vibrations in either of the above types of radiator are associated with compressional waves propagated in the direction of the thickness of the radiator, causing a compressional strain or dilatation of the radiator. This type of vibration is commonly referred to as a thickness vibration, or a thickness mode longitudinal vibration.

It has been shown by ultrasonic light diffraction methods that a spherical X-cut quartz ultrasonic focusing radiator radiates spherical waves, which waves come to a focus at the center of curvature of the radiator surface. The sharpness of focus is found to be limited only by wave diffraction, in the manner well known in optics.

I have found experimentally that the radiation from such a radiator is greatest at the center and that the efficiency of radiation from off-center areas progressively decreases as their distance from the center increases, but at different rates in different directions.

I have found from theoretical considerations that this variation of radiation efficiency is due to variations with orientation of the piezoelectric and elastic properties of the material of the radiator, and that the behavior may be calculated from known constants of the material.

In accordance with the present invention improved spherical focusing devices are made by varying the thickness or the peripheral shape, or both, of the active portion of the device in a manner calculable from the constants of the material.

Further in accordance with the invention, large spherical and cylindrical focusing devices are made in the form of a mosaic of smaller radiators each of which may have a preferred orientation with respect to the mother crystal or a preferred thickness variation, or both.

Also in accordance with the invention, one-piece cylindrical focusing radiators are made with a preferred orientation or a preferred thickness variation, or both.

In the accompanying figures:

Fig. 1 is an end view and Fig. 2 is a side elevation of an idealized quartz crystal;

Fig. 3 is a diagram showing the angles of inclination of the major and minor cap faces, respectively, in a quartz crystal;

Figs. 4 and 5 are top and front views of an X-cut spherical radiator;

Figure 8:
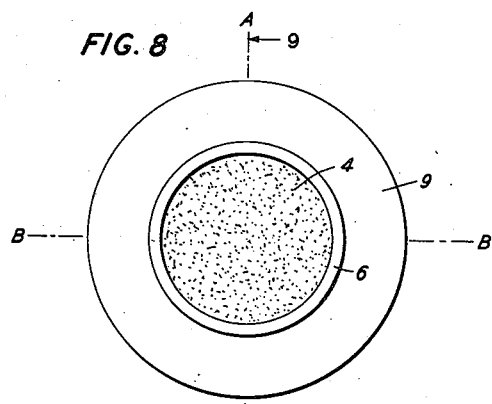
Figs. 8 and 9 are elevational and sectional views, respectively, of a spherical radiator in a metallic can-like mounting with electrodes applied to the radiator and a scheme of connections to a driving generator.
Figure 9:
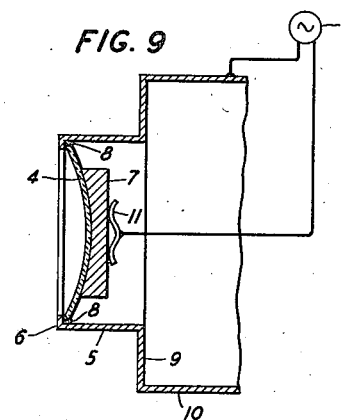
Figure 10:
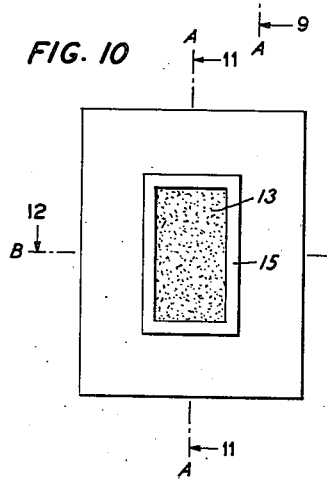
Figure 11:
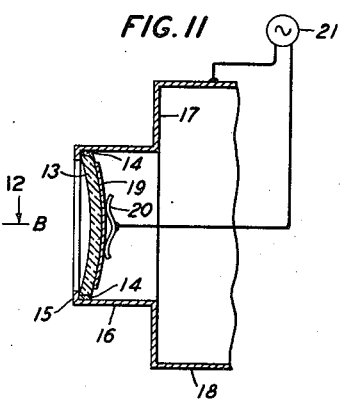
Figure 12:
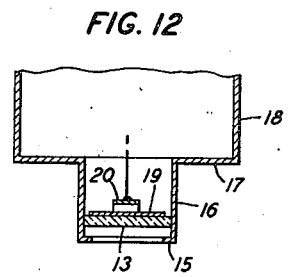
Figure 19:
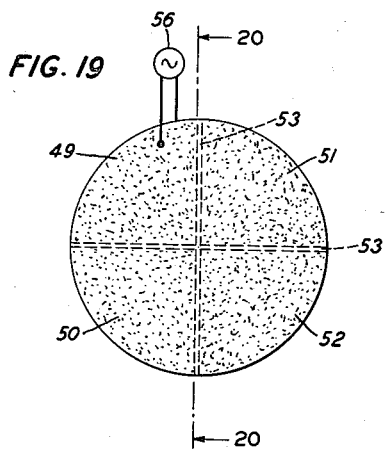
Figure 20:
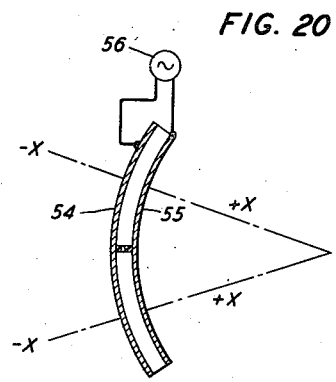
Figure 21:
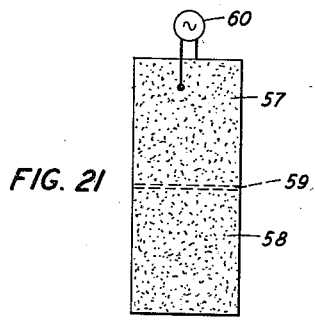
Figure 22:
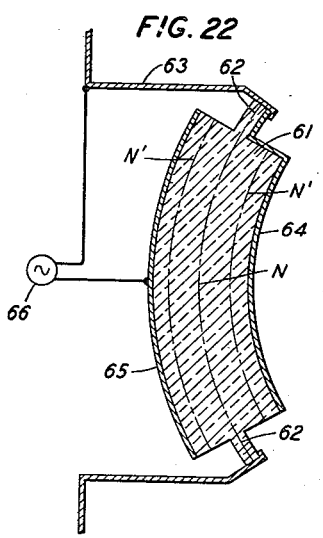
Figure 23:
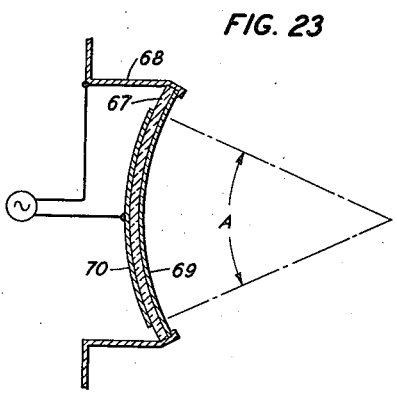
Figure 24:
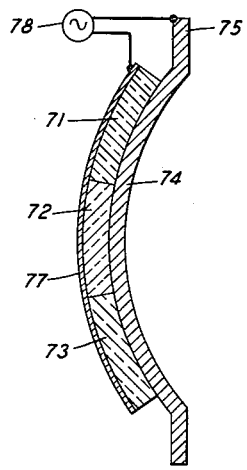
Figure 25:
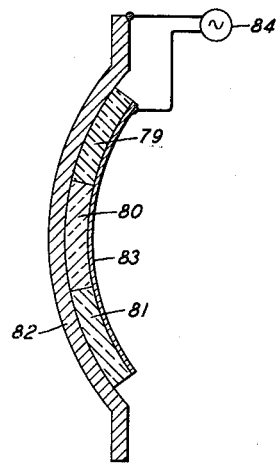
Figure 31:
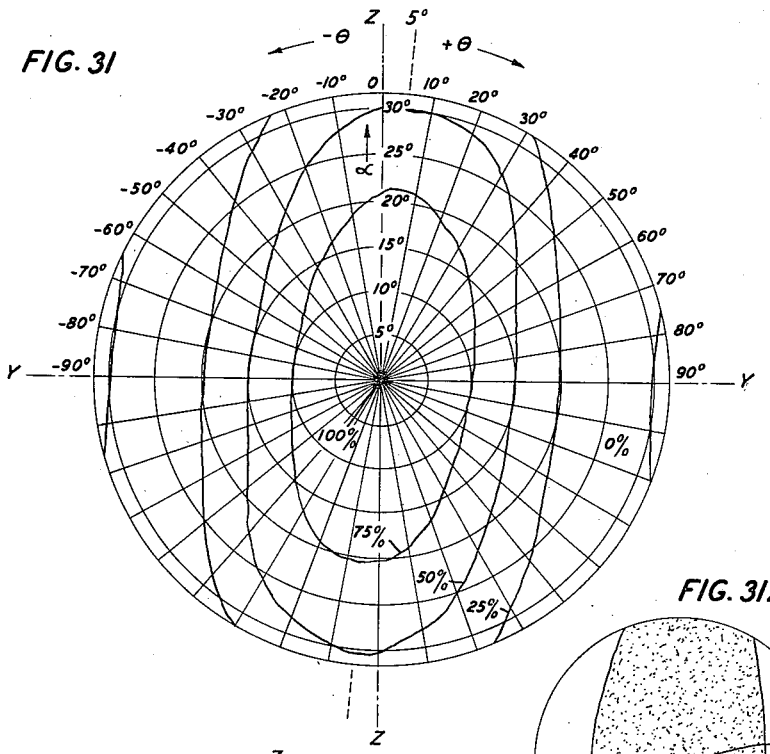
Figure 31A:
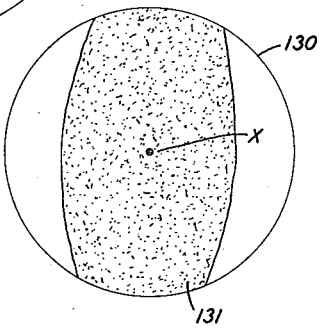
Figure 32:
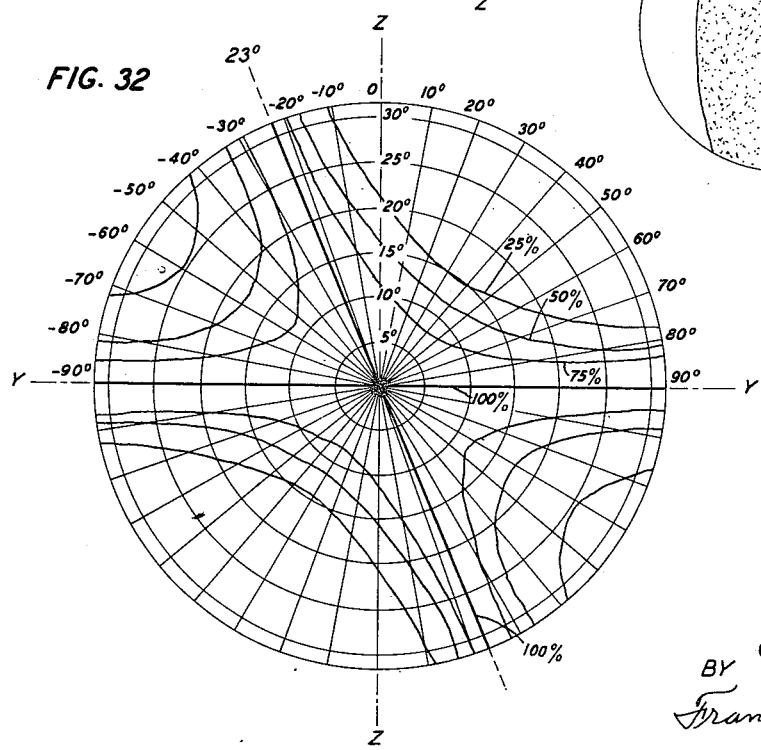
Figure 41:
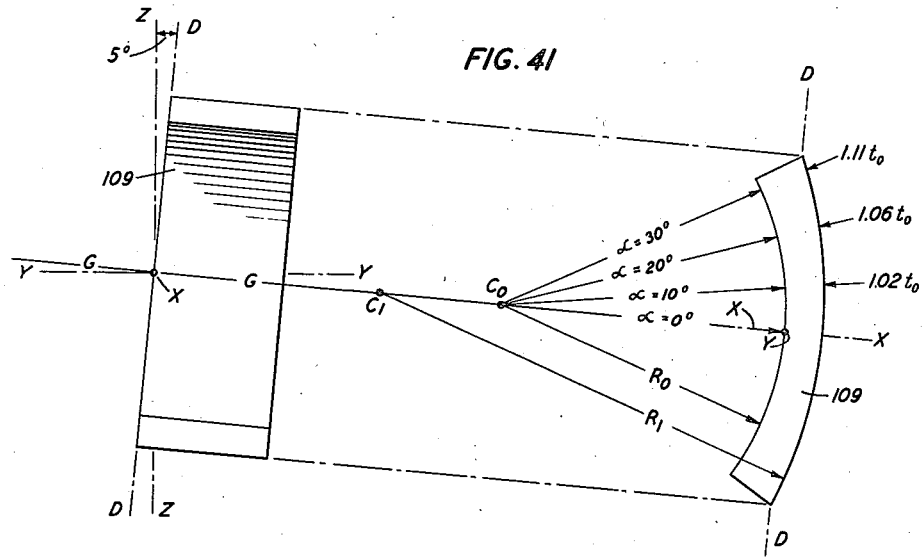
Figures 42, 43:
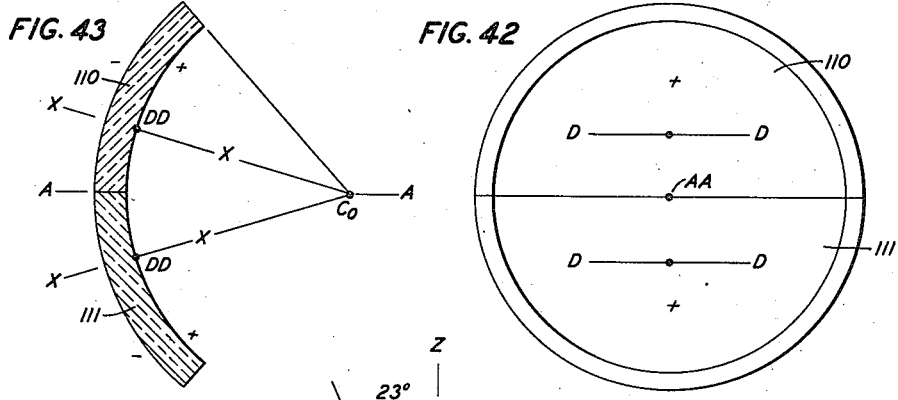
Figure 44:
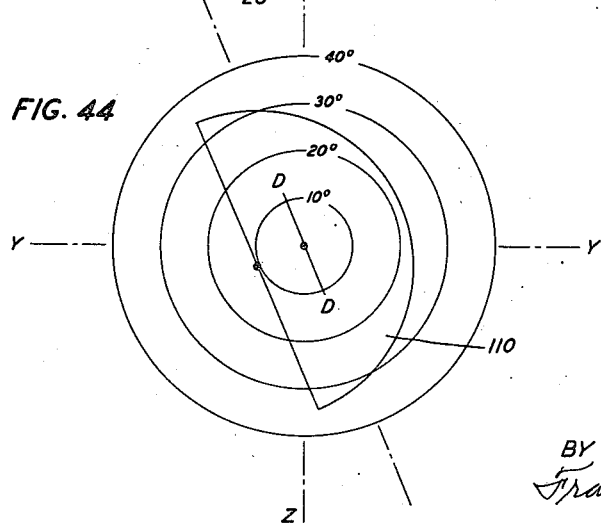
Figure 45:
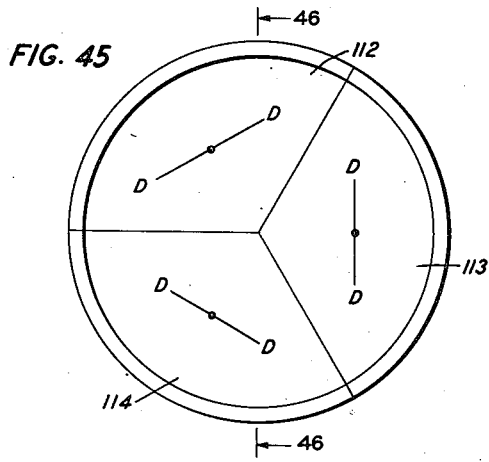
Figure 46:
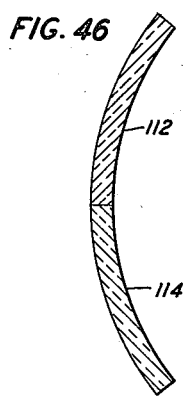
Figure 47:
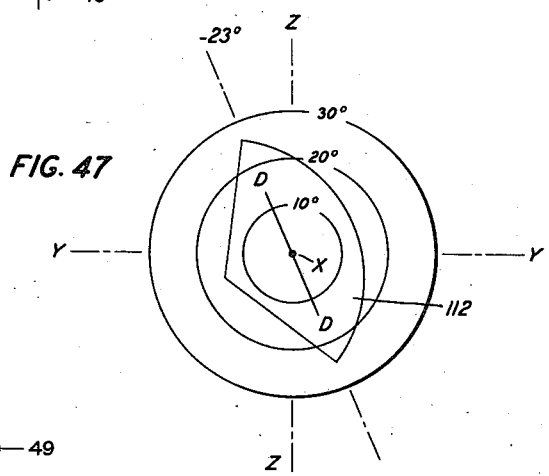
Figure 48:
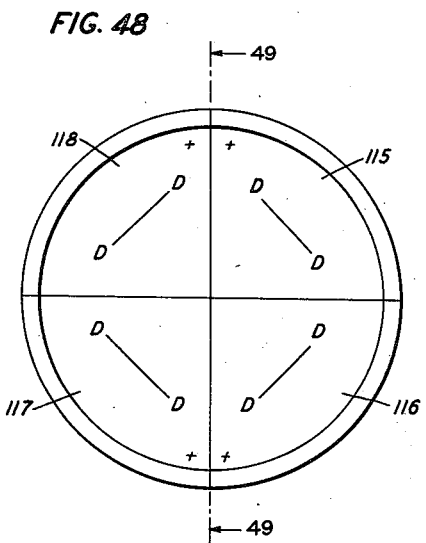
Figure 49:
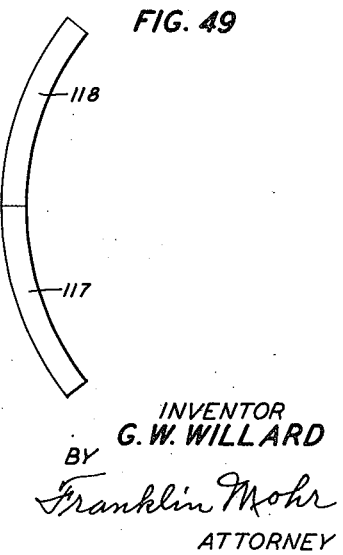

Figs. 10 to 12, inclusive, are elevational and two sectional views respectively of a cylindrical radiator mounted similarly to the spherical radiator of Figs. 8 and 9;

Figs. 13 and 14 are an elevational view and a sectional view, respectively, of a Y-cut spherical radiator, with a schematic diagram of electric connections;

Fig. 15 is an elevational view of a Y-cut cylindrical radiator;

Figs. 16 and 17 are elevational and sectional views, respectively, of a four-element mosaic spherical radiator with a schematic diagram of electric connections;

Fig. 18 is a sectional view, with schematic connections, of a two-element cylindrical mosaic radiator;

Figs. 19, 20 and 21 are views similar to Figs. 16, 17 and 18, respectively, except that they show the mosaics made up with joints of non-conductive cement and simpler electrodes made possible by this mode of construction;

Fig. 22 is a sectional view of a relatively thick radiator with nodal mounting;

Fig. 23 is a sectional view of a relatively thin radiator with an electrode covering less than the full surface of one side of the radiator;

Figs. 24 and 25 are sectional views of mosaic radiators mounted upon heavy metal plates;

Figs. 26 to 30, inclusive, are fragmentary views of mosaic radiators mounted upon heavy metal plates, the thickness of each radiator and each plate being specified in terms of an integral number of half wavelengths or of quarter wavelengths and the plates being provided with nodal mounting flanges;

Figs. 31 to 33, inclusive, are plots of relative radiation efficiency over the surface of a spherical quartz radiator;

Figs. 31A and 33A are elevational views of spherical radiators with peripherally-shaped electrodes;

Fig. 34 is a plot showing the required thickness correction of a spherical quartz radiator to make the resonant frequency the same at all points of the radiating surface;

Figs. 35 to 39, inclusive, are diagrams useful in explaining the manner of applying a simple approximate thickness correction to a spherical quartz radiator;

Fig. 40 is an orientation diagram for a specially oriented cylindrical quartz radiator of uniform thickness;

Fig. 41 is an orientation diagram for a specially oriented cylindrical quartz radiator with thickness shaping;

Figs. 42, 43 and 44, respectively, are an elevational view, a sectional view and an orientation diagram for a two-element mosaic spherical radiator of uniform thickness;

Figs. 45, 46 and 47 are similar views and a similar diagram, respectively, for a three-element mosaic spherical radiator of uniform thickness;

Figs. 48, 49 and 50 are similar views and a similar diagram, respectively, for a four-element mosaic spherical radiator of uniform thickness;

Fig. 51 is an orientation diagram for a two-element mosaic cylindrical radiator of uniform thickness; and Fig. 52 is a sectional view of a three-element mosaic cylindrical radiator of uniform thickness.

Figs. 1, 2 and 3 are given for reference in describing quartz crystal orientations. Fig. 1 is an end view of an idealized quartz crystal showing the well-known hexagonal cross-sectional shape, the several axes of symmetry and the principal faces which are visible in an end view. Fig. 1 applies to either end of the crystal and shows only those faces that are in the same position in either right-handed or left-handed quartz crystals. The faces $r$ are the major cap faces while those marked $z$ are the minor cap faces. The principal, or optical, axis Z of the crystal is at the center of the figure and extends perpendicularly to the surface of the drawing. The electric axes are designated $X_1$, $X_2$ and $X_3$, the numbering of these axes being arbitrarily chosen for the purposes of this figure. The several X-axes are in fact of equal importance and the order in which they are numbered is immaterial. The Y-axes are likewise arbitrarily designated $Y_1$, $Y_2$ and $Y_3$ and represent the three mechanical axes which are likewise of equal importance. Each X-axis passes through a pair of diagonally opposite vertices of the prism. Each Y-axis bisects a pair of opposite faces of the prism. The X and Y-axes are mutually perpendicular in pairs, $X_1Y_2$, $X_2Y_3$, and $X_3Y_1$, as the axes are numbered in Fig. 1. As shown in Figs. 1, there are at each end of the crystal three major and three minor cap faces.

The X, Y and Z crystallographic axes, of course, determine only directions relative to the crystal structure and hence may be regarded as translatable without rotation to any other portion of the crystal structure than actually shown in the drawing.

It will be recognized by those versed in the use of piezoelectric crystal materials that a set of crystallographic axes is customarily and conventionally defined in describing any crystalline substance. In connection with quartz crystals the orthogonal X, Y, Z-axes as shown in Fig. 1 are the conventional crystallographic axes. Quartz crystals, as well as many other piezoelectric crystals have an "electric axis." Although the term "electric axis" has been applied in the art primarily to quartz, it may be broadly defined as a direction in the piezoelectric material in which, when the material is compressed or elongated in that direction, there is produced a piezoelectric polarization in the same direction. In quartz the electric axis, so defined, is the X-axis. In tourmaline, the electric axis is the optical or Z-axis, and in Rochelle salt the electric axis is the axis sometimes known as the L-axis, which is defined as the direction making equal angles with the three orthogonal crystallographic axes, X, R, Z, of the Rochelle salt crystal.

An "electric cut" piezoelectric plate, shell or radiator, etc., is defined herein as one in which the surface of the central region of the plate, shell or radiator, etc., is normal to an electric axis as hereinbefore defined.

Accordingly, an electric cut spherical or cylindrical focusing radiator of quartz has the central area of its radiating surface normal to the X-axis of the mother crystal. An electric cut focusing radiator of tourmaline or of Rochelle salt, has the central area of its radiating surface normal to the Z-axis or to the L-axis, respectively.

Fig. 2 is a side view of the crystal of Fig. 1 shown with the Z-axis vertical and viewed in the direction of the axis $X_1$. Two of the six prism faces appear in Fig. 2 in elevation together with one major and one minor cap face.

Fig. 3 gives the values of the angles between the respective cap faces and the Z-axis. The figure represents a side elevation looking along one X-axis with the Z-axis shown in the vertical position on the drawing, a Y-axis being horizontal. The plane of the major cap face which is perpendicular to the surface of the paper is at an angle with respect to the Z-axis denoted by $\theta$ equal to minus 38 degrees 13 minutes. The corresponding angle for the minor cap face which is perpendicular to the surface of the paper is $\theta$ equal to plus 38 degrees 13 minutes.

Figs. 4 and 5 respectively show a top view and a front view of an X-cut spherical radiator or reflector, similar in form to a concavo-convex lens or to a spherical mirror. In Fig. 4, the Z-axis is perpendicular to the surface of the paper, the X-axis is vertical and the Y-axis is horizontal. The reflector or radiator 1 comprises a thin spherical shell or uniform thickness with the normal to the spherical surface at the center of the radiator lying along the X-axis. This type of radiator is found in the prior art. It is truly X-cut only at the center and approximately X-cut in the neighborhood of the center. At any point on the surface of the radiator at which the normal to the surface forms an angle of 30 degrees with the X-axis and 90 degrees with the Z-axis, the radiator is Y-cut. At any point on the radiator surface (or such surface extended) at which the normal to the surface forms an angle of 90 degrees with the X-axis and 90 degrees with the Y-axis the radiator is Z-cut. At other points on the spherical surface the radiator is intermediate between X-cut, Y-cut and Z-cut.

Figure 6:
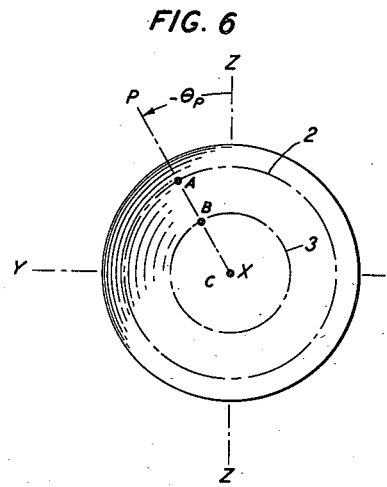
Figs. 6 and 7 are diagrams of a system of co-ordinates for conveniently specifying points upon a spherical surface and the orientation of specially cut crystals with respect to the crystallographic axes of the mother crystal.
Figure 7:
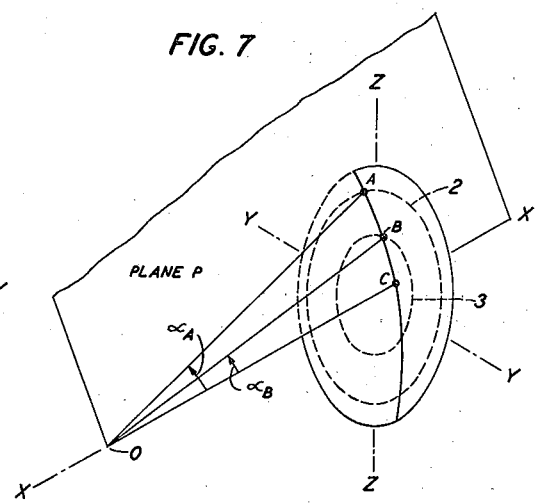

Figs. 6 and 7 illustrate a system of coordinates for defining the location of points on a spherical surface, which system is also convenient in explaining the orientation of compound spherical or cylindrical resonators with respect to the axes of the natural quartz crystal. Fig. 6 is a diagram resembling a front elevation of a concave spherical surface such as the resonator shown in Fig. 5. The point at which the X-axis intersects the spherical surface is designated C. A dot-dash line CP represents the trace of a plane P through the X-axis inclined at an angle of $-\theta_P$ with respect to the Z-axis. The plane P and its intersection with the spherical surface is shown in perspective in Fig. 7. The center of curvature of the spherical surface is shown at O and lies on the X-axis. The line segments OA, OB, and OC are radii of the spherical surface. The radius OA may be regarded as a generatrix of a conical surface for which the half angle at the apex of the generated cone is $\alpha_A$. The trace of this cone upon the spherical surface is represented by a dot-dash curve 2 through the point A. The radius OB is the generatrix of conical surface for which the half angle at the apex of the cone is $\alpha_B$ and the trace of the conical surface upon the spherical surface is denoted by the dot-dash curve 3. It will be evident that any point on the spherical surface may be identified by specifying the angle $\theta$ made by a plane such as P through the given point and the angle $\alpha$ of the radius vector to the point. For example, the point A is defined by the coordinates $-\theta_P$ and $\alpha_A$, the point B by $-\theta_P$ and $\alpha_B$, and the point C by the $\alpha$ coordinate zero, the $\theta$ coordinate in this case being indeterminate. All points on the spherical surface having the same value of $\theta$ lie in one and the same plane through the X-axis while all points having the same value of $\alpha$ lie on a circle having its center somewhere on the X-axis. Points on the same circle at opposite ends of a diameter in a quartz crystal have equal physical and electrical properties due to the symmetry of the quartz.

The positive and negative senses of the angle $\theta$ are defined with respect to the major and minor cap faces of the quartz crystal in the following manner. A plane parallel to the X-axis, such as the plane P in Figs. 6 and 7 is taken to have a negative angle $\theta$ when the plane is inclined to the Z-axis by virtue of a rotation from Z in the direction toward parallelism with the plane of a major cap face. The angle $\theta$ is deemed positive when the plane is inclined to the Z-axis by virtue of a rotation from Z in the direction toward parallelism with a minor cap face. This system for specifying the sense of the angle $\theta$ applies alike to right-handed and left-handed crystals and is independent of the direction in which the crystal is viewed.

Illustrative examples of suitable mountings, electrodes and electric drive connections for spherical or cylindrical radiators are shown in Figs. 8 to 30, inclusive.

Figs. 8 and 9 show a spherical radiator in a metallic can-like mounting with electrodes applied to the radiator and a source of alternating current connected to the electrodes. The spherical radiator is shown at 4, presenting its concave surface in an elevational view in Fig. 8 and appearing in cross-section in Fig. 9. The radiator has a circular aperture and its concave surface is entirely covered by a suitable conductive, e. g. metallic, film comprising one electrode for the radiator. The mounting 10 has a cylindrical portion 5 and a flange 6. In the angle formed between the cylindrical member 5 and the flange 6, the radiator 4 is fitted and secured preferably by means of solder or conductive cement so that there is a good electrical contact established between the conductive film on the concave surface of the radiator and the body of the metallic can. The inner edge of the flange 6 limits the aperture of the radiator. A back electrode 7 comprises a block of conductive material, e. g. aluminum, with a surface ground or otherwise shaped to conform to the convex back surface of the radiator 4. The electrode 7 does not cover the entire back surface of the radiator but only so much of said surface as is desired to be employed for the production of vibration in the radiator. In any case, to avoid short-circuiting the driving system, the electrode 7 should not make contact with the mounting or with the front electrode or with conductive material with which the radiator is secured to the mounting. The solder or cement securing the radiator to the mounting is indicated at 8. The mounting may have any desired shape, for example as illustrated in Figs. 8 and 9, the diameter of the can may be changed as by use of a collar 9 joining the cylindrical portion 5 to a portion 10 of different diameter or shape or both. A spring pressed retainer is indicated schematically at 11 for maintaining good electrical contact between itself and the electrode 7 and between the latter electrode and the radiator 4. A source 12 of alternating potential is indicated as connected between the mounting and the member 11 as a driving generator for the front and back electrodes of the radiator. The member 11 may be any suitable kind of retainer. The fastening at 8 may alternatively be in the form of a gasket for providing the desired electrical contact as well as for making a liquid-proof joint. The radiator together with the can mounting is of suitable design for constituting a portion of a wall of a tank to contain a fluid in which it is desired to produce vibrations by means of the piezoelectric radiator.

Figs. 10 to 12 inclusive show a cylindrical radiator in a mounting similar to that shown in Figs. 8 and 9 for a spherical radiator. Fig. 10 is a view looking into the concave surface of a cylindrical radiator, the cylindrical axis of which is horizontal in the figure. The radiator is shown at 13 and has a metallized or conductive coating forming the front electrode. The radiator 13 is conductively attached to the mounting by means of material shown at 14, the top and bottom edges of the radiator being set in a corner formed between a flange 15 and a cylindrical member 16. The members 15 and 16 together with a collar 17 and a cylindrical or rectangular box-like member 18 are metallic or conductive elements of a can-like mounting similar to that shown in Figs. 8 and 9. A cylindrical back electrode is shown at 19 together with a spring retainer 20 and a source of alternating potential 21 is shown connected between the cylindrical element 18 and the retainer 20.

The electrode arrangements for the front and back surfaces of the radiator as shown in Figs. 8 to 12 inclusive are designed particularly for X-cut crystals, meaning those which are truly X-cut at the center or which are predominately X-cut. Suitable electrode arrangements for a Y-cut crystal are shown in Figs. 13 to 15 inclusive. Fig. 13 represents a view of the convex back of a spherical radiator comprising a piezoelectric shell which is Y-cut at the center. The crystal radiator is designated 21 and is advantageously made of sufficient size and suitable curvature so that the peripheral portions of the radiator above and below the center are substantially X-cut, i. e., the aperture half-angle should be at least substantially 30 degrees. Due to the fact that adjacent X-axes in the crystal have piezoelectric effects which are inherently opposite in polarity, and since there is little or no mechanical vibration produced in the direction of a Y-axis, the Y-cut spherical radiator is rather inefficient as a producer of vibration unless special arrangements of the electrodes are employed. A push-pull drive is disclosed and is employed in connection with two spaced, electrically isolated electrodes on at least one of the surfaces of the radiator. Two electrodes 22 and 23 are shown on the back surface connected respectively to the outer terminals of a push-pull driving source comprising a divided or center-tapped transformer secondary winding 24, the primary winding 25 of which is connected to a source 26 of alternating potential. The front face of the crystal radiator 21 may be covered with a single electrode 27, connected to the center tap of the winding 24 by a lead 130.

In the operation of the system of Figs. 13 and 14, the electrodes 22 and 23 are driven 180 electrical degrees out of phase with each other by means of the source 26 and windings 24 and 25. The phase opposition thus introduced on the two portions of the crystal compensates for the opposite polarity of the piezoelectric effect along the two adjacent X-axes thereby causing the effects observed at the center of curvature of the radiator to become cumulative instead of wholly or partially annulling each other.

Fig. 15 is the back view of the cylindrical radiator which is Y-cut at the center and is provided with two back electrodes 28 and 29. The front surface should be covered with a single electrode similarly to the arrangement shown in Fig. 14. The electrical connection to the respective electrodes is similar to that shown in Fig. 13.

An X-cut piezoelectric radiator of spherical form being actually strictly X-cut only at the center and an X-cut cylindrical radiator being strictly X-cut only along its center line in a direction parallel to the axis of the cylinder, the efficiency of radiation of either the spherical or the cylindrical radiator is less at all off-center points than it is at the points where it is truly X-cut. This results from two factors. Firstly, the relative piezoelectric effect is greatest for the strictly X-cut region, and is increasingly reduced from this maximum upon recession from this region. Secondly, the resonant frequency of a curved radiator of uniform thickness varies from point to point over the surface of the radiator so that if the radiator is driven at resonance at one point on the surface the same driving force is out of resonance at other points. These results follow from the non-isotropic properties of the crystal material.

It will be evident that the most efficient radiator is the one with the smallest angular half-aperture $\alpha$. As the angular aperture is increased to obtain greater sharpness of focus and hence greater concentration of energy, the peripheral regions of the radiator become decreasingly effective.

An improvement over the arrangement of Figs. 8 to 15, inclusive, in accordance with the present invention lies in making a large radiator out of separate pieces of quartz so that each piece may be predominantly X-cut and all pieces may be of the same polarity. The more separate elements used the more nearly uniform will be the radiation efficiency over the whole surface and by using large angular apertures the sharpness of focus is greatly improved. Furthermore, the concentration of energy, which is known to be proportional to the fourth power of the aperture, becomes very great and the region of high intensity becomes very small.

A curved radiator may be built up of a plurality of sections, each of which is strictly X-cut at some point or points, the sections being fastened together to form a mosaic or compound radiator having the desired form, for example, spherical, cylindrical or otherwise curved.

Figs. 16 and 17 show a four-element mosaic spherical radiator made up of segments 30, 31, 32 and 33 each in the form of a sector. The sectors are soldered together at joints 34 as shown. Each sector is a curved X-cut piezoelectric plate and the polarity of all the sectors is made the same so as to produce a cumulative effect at the center of curvature of the radiator. The inner surface of the radiator is covered with a single electrode 35. On account of the conductive character of the soldered joint 34 the back of each sector is provided with a separate electrode in this way avoiding a short circuit between electrodes on the front and back surfaces through the solder. The back electrodes are designated 36, 37, 38 and 39 and are all connected electrically in parallel by connectors 40. A driving source 41 of alternating potential has one terminal connected to one of the connectors 40 and the other terminal connected to the electrode 35.

In the operation of the arrangements of Figs. 16 and 17 the electrodes 36, 37, 38 and 39 are driven in parallel and in like polarity by means of the source 41 and the piezoelectric effect from the respective sectors is cumulative at the center of curvature of the radiator. Furthermore, the average efficiency of the surface of each element is higher than the average efficiency of the single element spherical radiator of the same size aperture and the detuning effect of areas which are not strictly X-cut is less than in the case of the single spherical radiator. The X-axes of all the segmental plates 30, 31, 32 and 33 intersect at the common center of curvature which is the focus of the mosaic radiator.

Fig. 18 shows the back surface of a cylindrical radiator comprising two cylindrical elements 42 and 43 conductively fastened together by a soldered joint 44 and provided with separate electrodes 45 and 46, the latter being connected together by a connector 47. A source 48 of alternating potential is connected between the electrode 45 and an electrode on the inner face of the radiator. A cross-sectional view of the device of Fig. 18 would appear substantially the same as the cross-sectional view of the spherical radiator shown in Fig. 17. Each of the crystal elements 42 and 43 is X-cut and the two elements are of like polarity so as to produce a cumulative effect along the central axis of the cylindrical radiator.

A spherical radiator may be built up of any number of sections from two up, the illustration in Fig. 16 showing four elements being only one possible design. The larger the number of elements, the more predominantly X-cut each one may be and the greater the focusing effect of the mosaic radiator. Similarly, a cylindrical radiator may be made up of any number of elements with attendant increase in the efficiency of radiation with the number of elements used. The sections need not be sectors but the radiator may be subdivided in any desired manner.

The elements of the mosaic curved radiator may be put together with non-conductive cement instead of with solder or other conductive adhesive materials. In the case of a non-conductively cemented mosaic radiator, it is unnecessary to provide more than one electrode on each side of the composite radiators as the possibility of a short circuit between electrodes through the cement is eliminated.

Figs. 19 and 20 show a mosaic spherical radiator of four sectors 49, 50, 51 and 52 cemented together by non-conductive cement as indicated at 53 and provided with outer and inner electrodes 54 and 55 respectively, between which electrodes a source 56 of alternating potential is connected.

Fig. 21 shows an elevational view of a mosaic cylindrical radiator comprised of two sections 57 and 58 joined by means of non-conductive cement at 59 and driven by a source 60 of alternating potential. The cross-sectional view of the arrangement of Fig. 21 would appear substantially identical with the view shown in Fig. 20.

The mosaic radiators shown in Figs. 13 to 21 inclusive are designed for mounting in any suitable manner the same as the one-piece radiators shown in Figs. 8 to 12 inclusive.

It is generally desirable, of course, to mount a piezo-electric radiator in such a way that the part of the radiator which is held stationary by the mounting device does not have to take part in the vibrations of the mode which it is desired to generate in the radiator. For radiators which are not thin compared to the face dimensions a nodal mounting is desirable, i. e. a mounting secured at a nodal region of the vibratory system.

Fig. 22 shows a nodal mounting for a relatively thick radiator. The crystal is shown at 61 and has a nodal region N in the form of a neutral surface at the core of the radiator. The crystal 61 is cut with a flange or plurality of tabs 62 which are extensions of the nodal region. By means of the extension 62 the crystal is fastened into a metal mount 63. The crystal is furnished with inner and outer electrodes 64 and 65 respectively, the inner electrode 64 being conductively connected to the mount 63 as by means of a continuation of the electrode 64 over the surface of the end of the radiator and one of the extensions 62. The electrodes 64 and 65 are in antinodal regions when the crystal is vibrated. Additional nodal surfaces N' appear in a thick crystal when the crystal is vibrated at a harmonic of its fundamental frequency. A generator 66 of alternating potential is shown connected to the mounting 63 and the electrode 65. It will be noted that the region N is a node of motion for all odd harmonics of the fundamental frequency of the crystal.

In the case of radiators which are thin compared with their face dimensions and which are operated in liquids or solids in which the damping of the contacting medium is so large as to suppress or prevent vibration anywhere except at regions covered by electrodes on both sides of the crystal, nodal mounting is not necessary. It is sufficient in this case to restrict the vibrations of the crystal to a region which does not extend to the point of mounting. This may be done simply by restricting the area of one or both of the electrodes.

Fig. 23 shows a thin crystal in a mounting 68 in which vibration is restricted to the angle A as shown. A crystal 67 has a front electrode 69 which covers the entire surface of the radiator. A back electrode 70, however, covers less than the area of the radiator and the angle of activity or vibration in the crystal is substantially the angle A subtended by the electrode of smaller area, in this case the electrode 70.

Another method of mounting relatively thin crystal radiators is by cementing them to a metal reinforcing member which may be either on the front or back surface of the radiator. It is advantageous to correlate the thickness of the radiator with the thickness of the metal plate in such a way that there is little or no stress on the cement at the interface between the radiator and the reinforcing plate thereby minimizing the danger that the vibration may weaken or destroy the bond between the cemented surfaces. In cases where it is not necessary or expedient to relieve the cement of stress, thinner sections of material may be used both in the radiator and in the mounting plate. The latter arrangement has the disadvantage of developing high stress in the cement.

Fig. 24 shows a mosaic mounted by means of a metal plate. Three crystal elements 71, 72 and 73 are shown in cross-section, these elements being part of a mosaic of spherical, cylindrical or other curved shape. A front metal mounting plate 74 is shown with a peripheral mounting flange 75. A back electrode 77 is shown covering the entire back surface of the mosaic. The elements 71, 72 and 73 are either soldered or cemented to the plate 74 with the concave surface of the element fitted to the convex surface of the mounting plate. The joints between the elements 71, 72 and 73 may be either uncemented or secured with non-conducting cement. Vibrations are transmitted through the plate 74 from the elements 71, 72 and 73 and radiated by the concave surface of the plate 74.

To insure a minimum of stress on the cement at the interface between the mosaic elements and the mounting plate, the thickness of the crystal element should be an integral number of half wavelengths at the operating frequency of the radiator. As in wave motion generally, the wavelength in a given material is equal to the ratio of the velocity of propagation of the waves in the said material to the operating frequency. The thickness of the mounting plate should likewise be equal to an integral number of half wavelengths as computed for the transmission of the waves of the operating frequency through the material of the mounting plate. As the velocity of transmission is generally different depending upon the material in which the waves are transmitted, the thickness of the mounting plate and the thickness of the radiator will generally be unequal even though the thickness of each may represent the same number of half wavelengths. The mounting flange 75 and the back electrode 77 are connected electrically to the respective terminals of a generator 78 of alternating potentials of the desired operating frequency.

Fig. 25 shows an arrangement similar to that shown in Fig. 4 but using a mounting plate attached to the back surfaces of the crystal elements and a thin electrode attached to the front surfaces instead of vice versa. Radiator elements 79, 80 and 81 are shown in cross-section with their back surfaces attached to a mounting plate 82 and having an electrode 83 attached to their front surfaces. A source 84 of alternating potential is shown connected between the mounting plate 82 and the front electrode 83. The thicknesses of the radiator elements and of the mounting plate should be selected to be integral numbers of half wavelengths in the respective materials, as described in connection with the arrangement of Fig. 24.

In arrangements like those of Figs. 24 and 25, thinner sections of material may be utilized by making the thickness of the mounting plate a quarter wavelength and the thickness of the radiator likewise a quarter wavelength. In this case there exists the disadvantage aforementioned that excessively high stress may be developed in the cement between the mounting plate and the crystal element. When quarter wavelength thicknesses are employed, the interface between the crystal and the mounting plate is a node of motion and therefore an antinode of stress, whereas when half wavelength thicknesses are employed the interface is a node of stress but an antinode of motion. In the arrangements of Figs. 24 and 25 the mounting flanges are of substantially the same thickness as the mounting plate.

Figure 26:
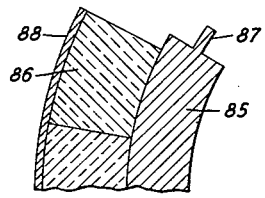

Figs. 26 to 30 inclusive are fragmentary views showing the use of thick mounting plates with relatively thin nodal mounting flanges. In Fig. 26 the mounting plate 85 of metal is a half wavelength thick as measured in the metal and the radiator element 60 is a half wavelength thick as measured in the material of the crystal. A mounting flange 87 extends from the central plane of the mounting plate 85 and is thus located at a node of motion. A back electrode 88 is shown attached to the back surface of the radiator.

Figure 27:
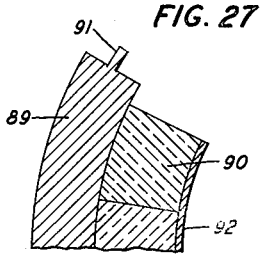

Fig. 27 shows a back mounting plate 89 and a radiator element 90, the plate 89 having a nodal mounting flange 91. The radiator has a front electrode 92.

Figure 28:
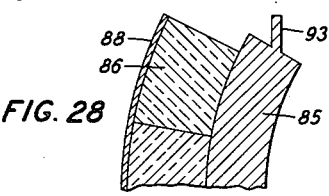

Fig. 28 is similar to Fig. 26 except that the mounting plate 85 has a nodal mounting flange 93 especially oriented for mounting against a plane surface whereas the mounting flange 87 in Fig. 26 is circumferential in shape to fit a spherical mounting surface.

Figure 29:
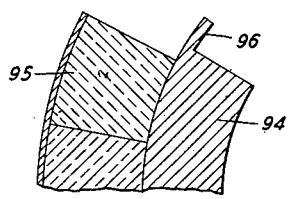

In Fig. 29 there is shown a front mounting plate 94 which has a thickness of a quarter wavelength as measured in the material of the mounting plate. A crystal element 95 has a thickness also equal to a quarter of a wavelength as measured in the material of the crystal. A mounting plate 94 has a mounting flange 96 located in the region of the intersurface between the radiator element 95 and the mounting plate 94, the flange 96 again being at a node of motion.

Figure 30:
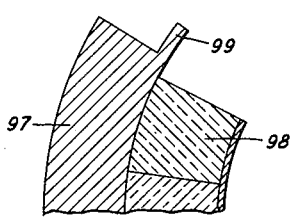

Fig. 30 shows a back mounting plate 97 and a radiator element 98, the mounting plate 97 having a mounting flange 99. The thicknesses of the members 97 and 98 are each equal to a quarter wavelength as measured in the respective material. The mounting flange 99 is located at a node of motion.

A study of the radiation pattern of curved radiators with regard to their focusing properties, and computations by applicant from the piezoelectric and elastic constants of quartz, have shown that non-uniform radiation over the surface of the radiator interferes with the efficient operation of the radiator in focusing ultrasonic energy into a restricted region such as the point focus of a spherical radiator or the line focus of a cylindrical one. The most obvious cause of non-uniform radiation arises from the fact that the curvature of the radiator introduces non-uniformity in the electromechanical coupling associated with the differently oriented surfaces of the radiator. While at the center the radiator is a true X-cut plate, that is, the thickness of the plate extends in the direction parallel to the X crystallographic axis of the crystal, off-center surfaces differ from the true X-cut by angles of 10, 20, 30, or more degrees in extreme cases. For example, in a radiator whose peripheral diameter is equal to its radius of curvature, all points on the periphery are 30 degrees from truly X-cut, and in fact two of these peripheral points, diametrically opposed, are actually Y-cut. Off-center, electromechanical coupling decreases in all directions from the region of true X-cut but it is found that the decrease is much faster going towards the Y-axis than going towards the Z-axis. In radiators of even moderate aperture, say 10 degrees for $\alpha$, the effect of reduced electromechanical coupling at the edge of the radiator is to reduce the intensity of radiation to a minimum value of 75 per cent of that at the center. In extreme cases, the coupling falls to zero, that is, there can be no radiation produced at all in the direction of the Y-axis or the Z-axis. For a radiator having a maximum value of $\alpha$ equal to 20 degrees the lowest value of electromechanical coupling at the edge is such that for the two edge regions having this value the radiation intensity is only 50 per cent of that at the center.

While in radiators of small $\alpha$ angle the effect of non-uniform electromechanical coupling upon the focusing properties of the radiator may not be discernible, there is found to be a considerable effect due to another cause, namely, the variations of the effective frequency constant over the surface of the radiator. The frequency constant is the product of the resonant frequency and the effective length of the vibrator, i. e. the thickness of the shell. At the center the frequency constant is that of an X-cut plate. Off center the frequency constant may be greater, less or the same depending upon location. When the radiator is driven at the resonant frequency of its center, then any region having either higher or lower resonant frequencies, due to a different frequency constant, will radiate with lower efficiency. A discrepancy in the frequency constant amounting to 5 per cent can result in a reduction of the radiation efficiency to about 50 per cent for radiation into non-metallic liquid. For a radiator with peripheral areas 20 degrees and 30 degrees off, the minimum efficiency would drop to 20 per cent and 5 per cent respectively. Further, if the frequency of excitation is shifted from that appropriate to the center, areas other than central areas will in general radiate more strongly than the center.

The importance of discrepancies in the frequency constant as affecting the efficiency of radiation depends to a large extent upon the degree of impedance matching which exists between the radiator and the material into which it radiates. A quartz crystal radiating into mercury shows practically no effects of frequency constant discrepancy because the impedance match between quartz and mercury is relatively good, resulting in a band width of transmission that is much greater than the amount of the frequency constant discrepancy. On the other hand, a quartz radiator working into non-metallic liquids is very badly mismatched from an impedance standpoint and has a transmission band width so narrow that the frequency constant discrepancy is relatively important and may produce very low over-all radiation efficiency.

The electromechanical coupling associated with the $(a,\theta)$ direction is given by $$k' = 2d'_{11}(\pi c'_{11}/K')^{1/2}$$

where $d'_{11}$ is the piezoelectric strain constant, $c'_{11}$ is the elastic stiffness coefficient, and $K'$ is the dielectric constant, each associated with the $(a,\theta)$ direction in the same way as $d_{11}$, $c_{11}$ and $K$ are associated with the normal $X$, $Y$, $Z$ crystallographic axes. The electromechanical coupling associated with the X-axis direction is $$k = 2d_{11}(\pi c_{11}/K)^{1/2}$$

The ratio of $k'/k = (d'_{11}/d_{11})(c'_{11}/c_{11})^{1/2}$, neglecting the relatively very small change of $K'$ with orientation, is equal to the ratio of the sound radiation amplitudes $A'/A$, where $A'$ again refers to a radiator surface region whose normal is in the $(a,\theta)$ direction and $A$ refers to the truly X-cut region at the center of the radiator, and all portions are assumed here as driven at their resonant frequency. Now the orientation sensitive $d'_{11}$ and $c'_{11}$ are calculable by well-known means from the well-known values of $d_{11}$ and $c_{11}$, $c_{33}$, $c_{44}$, $c_{13}$ and $c_{14}$ for quartz. Hence the relative radiation efficiency, as effected only by variations of electromechanical coupling, $E_m$ is given by the ratio of the square of the above amplitudes, that is $E_m = (A'/A)^2 = (k'/k)^2$. The radiation efficiency is unity, or 100 per cent, for the X-cut portion of the radiator and less than unity (less than 100 per cent) for all other portions.

Fig. 31 shows the variation in radiation efficiency $E_m$ over the surface of a concave spherical radiator, the positions on the surface being defined by the angles $a$ and $\theta$ as defined in Figs. 6 and 7. In Fig. 31 a polar system of coordinates is used, the radial lines representing values of $\theta$ labeled in degrees around the periphery of the diagram and the concentric circles representing values of $a$, each circle being labeled in degrees. The radiation efficiency $E_m$ at the center of the diagram is taken as 100 per cent. Contour lines showing the location of points having efficiency values respectively 75 per cent, 50 per cent and 25 per cent are shown. A plane of greatest efficiency from the standpoint of electromechanical coupling alone is found to exist for the value of $\theta$ equal to approximately $+5$ degrees. It will be noted that the efficiency due to this cause falls off more rapidly in the direction of the Y-axis than in the direction of the Z-axis.

Inspection of Fig. 31 suggests the possibility of periphery-shaping of the radiator to eliminate those portions of the surface which operate at the lower power efficiencies. For example, a radiator may be reduced in area by cutting away the portions which are less than 25 per cent effective and using only the somewhat oval-shaped central portion bounded by the 25 per cent contours. The elimination of the outer portions, where the efficiency is low, results in some improvement in the electrical characteristics of the radiator because it reduces the amount of reactive load by eliminating that part of the load which would otherwise fall upon the peripheral portions that have been cut away.

The frequency constant associated with the $(a,\theta)$ direction is given by $F' = (c'_{11}/4\rho)^{1/2}$ where $c'_{11}$ is as above and $\rho$ is the density. The frequency constant associated with the X-axis direction is $F = (c_{11}/4\rho)^{1/2}$, and $F'/F = (c'_{11}/c_{11})^{1/2}$ is the ratio of the frequency constant in the $(a,\theta)$ direction relative to that in the X-axis direction. For a radiator of uniform thickness the actual resonant frequency for the $(a,\theta)$ direction relative to that in the X-direction is also given by $F'/F$. For such a radiator driven at the resonant frequency $Ft$, $t$ being the uniform thickness, the ratio of the radiated amplitude, $A'$ for the $(a,\theta)$ direction and $A$ for the X-direction, is given by $A'/A = [1 + (4N^2 - 2) \cot^2 (\pi F'/2F)]^{-1/2}$, where $N$ equals the product density times velocity for the radiator divided by the product density times velocity for the liquid into which it radiates. This formula holds closely for $N$ in the neighborhood of ten, as it is for quartz radiating into non-metallic liquids on one side only, and for $F'/F = n \pm 2$ where $n$ is an odd whole number, as is found to be the case for quartz radiators whose $a$ is less than 35 degrees. Thus the relative radiation efficiency, as affected only by off-resonance, is $$E_f = (A'/A)^2 = 1/[1 + (4N^2 - 2) \cot^2 (\pi F'/2F)]$$

which has a value of unity (100 per cent) in the X-direction, and less than unity (less than 100 per cent) in most $(a,\theta)$ directions.

Fig. 32 shows the variation of the radiation efficiency $E_f$ over the surface of a spherical radiator. The coordinate system is the same as that used in Fig. 31. The radiation efficiency at the center of the diagram is taken as 100 per cent. The contours on the diagram show where the efficiency is 75 per cent, 50 per cent and 25 per cent respectively compared with its value at the center. In this case, two planes of maximum efficiency appear, one for the value of $\theta = -23$ degrees and the other for the value $\theta =$ to $+$ or $-90$ degrees.

Fig. 33 shows the combined effect of the variations of electromechanical coupling and frequency constant. The value of the resultant radiating efficiency $(E_m E_f)$ at the center of the diagram is taken as 100 per cent. Contours are given for radiation efficiencies of 75 per cent, 50 per cent and 25 per cent. Some advantage may be obtained by shaping the contour of a spherical radiator to conform to the 25 per cent contour shown in Fig. 33 or a rectangular-shaped section may be used approximating one of the contours. The planes of greatest efficiency as shown in Fig. 33 occur at $\theta =$ to $-23$ degrees and θ= to + or −90 degrees as in the case of Fig. 32.

It is clear that when the periphery of a spherical shell is not circular the periphery will not lie in a plane. This of course involves some added difficulties in manufacture of the shell and also in mounting the same in a tank wall. However, the full advantages of periphery-shaping, as noted above, may still be obtained with a spherical shell whose periphery is actually circular by periphery-shaping one or both electrodes only. This is clear from the previously mentioned fact that the radiator radiates only from such regions as are covered by electrodes on both sides. It has been common practice in the past to restrict one electrode to a smaller area but of the same peripheral shape as the radiator for the purpose of leaving the outer mounting areas unenergized. Hence, for the present purpose one, or both, electrode surfaces may be restricted to peripheral shape corresponding to the shape of the preferred region of radiation, for example the shape and area of curve "25%" of Fig. 31 or Fig. 33, the center of the electrode coinciding with the location of the X-axis in the radiator.

Fig. 31A shows a view of one face (which may be either the concave or the convex side) of a spherical radiator 130 upon which face is mounted an electrode 131 of peripheral shape conforming to the curve "25 per cent" of Fig. 31.

Fig. 33A shows a similar view of a spherical radiator 132 with an electrode 133 of peripheral shape conforming to the curve "25 per cent" of Fig. 33.

The variation of the frequency constant of the radiator may be compensated by varying the thickness of the radiator from point to point, so that the resonant frequency $F't'$ is everywhere equal to $Ft$, the resonant frequency in the X-direction, $t$ being the thickness in the X-direction and $t'$ the thickness in the $(\alpha,\theta)$ direction.

Fig. 34 shows the amount of thickness correction required at various points on the surface of a spherical radiator in order that the resonant frequency may be made uniform over the surface of the radiator. The contour lines in Fig. 34 connect points where the correct compensatory change in thickness is the same. The contours which are labeled with positive values show where the thickness of the radiator is to be made greater than at the center while the contours labeled with negative values indicate where the thickness is to be made less than at the center. Decreases in thickness to a maximum of 6 per cent are indicated and increases range as high as 16 per cent. It will be noted that for $\theta$ equal to −23 degrees and also for $\theta$ equal to + or −90 degrees no thickness correction is necessary. In the plane determined by $\theta=$ −55 degrees the thickness-shaped radiator is of normal thickness at the center and less than normal thickness toward the periphery. In the plane determined by $\theta=$ +35 degrees, the radiator is of normal thickness at the center and greater than normal thickness toward the periphery.

In thickness-shaping a radiator the concave surface is preferably left truly spherical to radiate a spherical wave with sharpest focus, the convex surface being made sufficiently non-spherical to take up variation of thickness. The above formula for $E_f$ shows that if $F'$ is within 1 per cent of $F$ the radiation efficiency will not be less than 90 per cent, and hence certain compromises in thickness-shaping will avoid or greatly reduce the major off-resonance losses. These measures involve thickness-shapes common in astigmatic spectacle lenses. Thus, an astigmatic or cylindrical correction of proper orientation may be made to approximately compensate for the too small thickness in the $\theta=$ +35-degree sectors and at the same time compensate for too great thickness in the $\theta=$ −55-degree sectors. Alternatively, two separate astigmatic corrections may be applied, one to each surface of the lens radiator. The lesser correction should be applied to the concave surface, since a deviation from a spherical surface will affect the sharpness of focus.

Fig. 35 is a simplified diagram showing the location of the planes $\theta=$ −55 degrees and $\theta=$ +35 degrees for reference in connection with Figs. 36 and 37 which show cross-sections of the thickness-shaped radiator for the planes $\theta=$ −55 degrees and +35 degrees respectively.

The cross-sections shown in Figs. 36 and 37 are suitable approximations to the theoretically exact thickness-shaping as plotted in Fig. 34. The concave surface of the spherical radiator with approximate thickness-shaping may be a true spherical surface with radius $R_0$ as shown in Figs. 36 and 37. The cross-section of Fig. 36 may be obtained by forming the convex surface to a circular shape of radius $R_2$ about a center $C_2$ which is displaced from the center $C_0$ in the direction toward the radiating surface by a distance designated $d_2$, the points $C_0$ and $C_2$ both lying on the X-axis which passes through the center of the radiator. The cross-section shown in Fig. 37 may be obtained by forming the convex surface of the radiator to a circular shape with a radius $R_1$ about a center $C_1$ displaced along the X-axis beyond the point $C_0$ by a distance designated $d_1$. Figs. 36 and 37 have the point $C_0$ in common.

For further clarification of the thickness-shaped spherical resonator, Figs. 38 and 39 are given showing respectively the concave inner surface and the convex outer surface of the radiator, both as viewed, however, from the concave side. Fig. 28 shows the periphery of the inner face of the resonator at 100. As noted above, the inner surface is truly spherical, the center of curvature being shown at the point $C_0$ located on the X-axis. The center of the spherical surface is shown at 101. A number of radii are shown of length $R_0$. The curves 102 and 103 are circular arcs of great circles on the spherical surface.

Fig. 39 shows the periphery of the convex surface of the radiator at 104. The center of the convex surface is shown at 105 and is located at a distance from the center $C_0$ equal to $R_0$ plus the thickness $t_0$ of the radiator. The center 105 has a distance from the center of curvature $C_0$ which is also equal to $d_2$ plus $R_2$. The Z-axis is shown inclined at an angle of 35 degrees with respect to the vertical axis AA. The horizontal BB is also shown in perspective. The curve 106 is a great circle arc of radius $R_1$ and center $C_1$ connecting the ends of the AA axis and the curve 107 is a great circle arc of radius $R_2$ and center $C_2$ connecting the ends of the axis BB. The point $C_1$ is on the X-axis at a distance $d_1$ beyond the point $C_0$ while the point $C_2$ is closer to the radiator than the point $C_0$ by a distance $d_2$.

It will be noted that the curvature of the radiator has been defined with closest approximation to the values given in Fig. 34 for $\theta=$ +35 degrees and $\theta=$ −55 degrees, and less approximately in general for other values of $\theta$.

The values of $d_1$ and $d_2$ are very small to $R_0$, being of the order of $t_0$. This may be shown from the approximate formula $$d = t_0(t'/t_0)/(1 - \cos a)$$

For example, considering the circular curve 106 of Fig. 39, suppose that for the extreme points AA the value of $a$ is 30 degrees. Then from Fig. 34, for $a$ equals 30 degrees and $\theta$ equals plus 35 degrees, $t'/t$ equals 1.17, and hence $d_1$ equals plus 1.18 $t_0$, and $R_1$ equals $R_0 + t_0 + d_1$ equals $R_0 + 2.18\ t_0$. Similarly for the curve 107 of Fig. 39, the BB points at $a$ equals 30 degrees and $\theta$ equals minus 55 degrees, $t'/t$ equals .335, and $d_2$ equals minus .45 $t_0$, $R_2$ equals $R_0 + t_0 + d_2$ equals $R_0 + .55\ t_0$.

Thus it is seen that the convex surface of Fig. 39 is nearly spherical but with slight cylindrical corrections, that is, a weakly astigmatic surface.

Fig. 40 shows a cylindrical radiator which is specially oriented with respect to the crystallographic axes of the mother crystal and is of uniform thickness throughout. The figure shows the cylindrical radiator 108 in elevation and cross-section. A generatrix GG of the cylindrical surface lies in the YZ plane at an angle of +57 degrees with respect to the Z-axis. A reference axis DD is shown lying in the YZ plane at an angle of −23 degrees with respect to the Z-axis, and at right angles to the generatrix GG. The center of curvature of the concave cylindrical surface is shown at C located on the X-axis and the radius of curvature is R. Since this cylindrical radiator 108 is curved in one direction only it is possible to have this plane of curvature, the DDX plane, coincide with the plane of maximum efficiency which occurs at $\theta = -23$ degrees in Figs. 32 and 33. Thus, this radiator, whose thickness is uniform, is not subject to the large off-resonance reduction of efficiency noted previously. The small reduction of efficiency due to reduced electromechanical coupling which ocurs in this plane $\theta = -23$ degrees, as shown in Fig. 31, still is present.

Fig. 41 shows another specially oriented cylindrical radiator which incorporates thickness-shaping in addition to special orientation. The radiator is shown at 109 in elevation and in cross-section. In this case the orientation is so chosen that the reduction of radiation efficiency due to reduced electro-mechanical coupling is least, (plane $\theta = +5$ degrees of Fig. 31), and the thickness is shaped to eliminate the reduction of efficiency due to variation of frequency constant that was shown for the $\theta = +5$-degree plane of Fig. 32. The generatrix GG and the axis DD are inclined at an angle of +5 degrees from the Y and Z axes, respectively, in order to take advantage of the plane of maximum efficiency shown in Fig. 31 at an angle of $\theta = +5$ degrees. The thickness-shaping is that approximately determined according to Fig. 34 for $\theta = +5$ degrees and varied according to the value of the angle $a$. A convenient approximation is applied whereby the front and back surfaces of the cylindrical radiator are both circular cylindrical surfaces but of different radii and having different centers of curvature, the centers being located on the X-axis, and their separation $d$ may be determined from the formula for $d$ previously given. In the arrangement of Fig. 41, the variation in electromechanical coupling is taken advantage of in the orientation of the crystal and the variation in the frequency constant is corrected by means of thickness-shaping.

Figs. 42, 43 and 44 relate to a two-element mosaic spherical radiator in which each element is specially oriented and no thickness-shaping is employed. The two elements are designated 110 and 111 and they are identical in all respects except position in the mosaic. The orientation of the element 110 with respect to the crystallographic axes is shown in Fig. 44 using the system of coordinates $\theta$ and $a$ as defined in Figs. 6 and 7. Its axis DD lies in the YZ plane at an angle of −23 degrees with respect to the Z-axis, thereby taking advantage of the axis of maximum efficiency determined by Figs. 32 and 33. The axis DD passes through the X-axis and, being in the YZ plane, is perpendicular to the X-axis. Each of the elements 110 and 111 has the peripheral outline of a semicircle and the two elements are suitably fastened together to form a mosaic spherical radiator of circular aperture. As the X-axes of the two elements may be selected to be of like polarity, the elements 110 and 111 have cumulative effects at the focal point $C_0$. The maximum value of $a$ in the embodiment of Figs. 42, 43 and 44 is approximately 35 degrees as may be seen by inspection of Fig. 44. Larger or smaller maximum values of $a$ may of course be employed but reference to Fig. 33 will show that the larger values of $a$ bring in only relatively inefficient radiating surfaces and are therefore usually less desirable.

Figs. 45, 46 and 47 show a three-element mosaic spherical radiator of uniform thickness comprising elements 112, 113 and 114 which are all identical in shape and are cut in the orientation shown in Fig. 47. It will be noted that for the same size of circular aperture each of the elements 112, 113 and 114 is smaller than the element 110 of Fig. 44 and hence is contained within a region of higher radiation efficiency on the average than is the element 110.

Figs. 48, 49 and 50 show a four-element mosaic spherical radiator having elements 115, 116, 117 and 118 which are identical in shape and are cut in the orientation shown in Fig. 50. Here again the relative size of the element is smaller and therefore the average radiation efficiency is higher than in the immediately preceding embodiments.

Fig. 51 shows a two-element mosaic cylindrical radiator of uniform thickness comprising the elements 119 and 120. The elements 119 and 120 are identical in shape and each is oriented at $\theta$ equal to −23 degrees like element 108 in Fig. 40.

Fig. 52 shows a cross-sectional view of a three-element mosaic cylindrical radiator comprising elements 121, 122 and 123 all of which are oriented like the element 120 or the element 108. For the same size of aperture, the three-element cylindrical radiator comprises elements each of which is relatively more efficient in radiation due to the smaller aperture of the individual element.

Correspondingly, mosaic cylindrical radiators may be formed from thickness-shaped elements, all of which are alike, and each of which are oriented and shaped like element 109 of Fig. 41. Each of these elements of course has the same polarity of the X-axis on the concave face, and each element is mounted so that its concave surface lies on a single cylindrical surface whose radius of curvature is that of the concave surface of each element.

While the above principles of thickness-shaping, periphery-shaping, and orientation have been applied specifically to quartz focusing radiators, it is understood that the same principles may be applied to obtaining improved focusing radiators of other piezoelectric materials. For example, an unimproved, spherical tourmaline radiator would be a constant thickness, circular periphery Z-cut tourmaline shell, and the corresponding cylindrical radiator would be a Z-cut cylindrical shell. Improvement in the spherical radiator would be obtained by proper thickness-shaping or periphery-shaping or both. Improvement in the cylindrical radiator would be obtained by orientation or by orientation and thickness-shaping. Similarly improved mosaic radiators may be designed in both types. The actual degrees or amounts of thickness-shaping, periphery-shaping, and secondary orientation may be determined by calculation from the known piezoelectric and elastic constants of tourmaline.

Similar applications of the principles of the present invention may be made in the case of Rochelle salt crystals.

Accordingly, the embodiments of the invention described herein are to be regarded as illustrative and not as limiting the invention, which is applicable to many other materials, physical forms and uses within the scope of the appended claims.

What is claimed is:

1. A composite curved surfaced focusing sound radiator comprising a plurality of curved piezoelectric plates fastened together, each said plate having a radiating surface including an area substantially perpendicular to an X-axis of the respective mother crystal, each said element being oriented with the X-axis passing through the focus of the composite radiator.

2. A radiator in accordance with claim 1 in which the respective curved plates are of the same polarity of piezoelectric effect.

3. A line focusing sound radiator comprising a piezoelectric quartz plate in the form of a circular cylindrical shell of uniform thickness, the generatrices of the cylindrical surfaces of which are parallel to a YZ-plane of the mother crystal and are perpendicular to a plane through an X-axis of the mother crystal which plane is inclined to the Z-axis by an angle of substantially 23 degrees in the direction of parallelism with a major cap face, the normal to the radiating surface at the center of the element being parallel to the X-axis.

4. A point focusing sound radiator comprising a mosaic spherical shell of piezoelectric quartz made up of a plurality of segments, each segment having a central point at which the normal to the surface is parallel to an X-axis of the mother crystal of the respective segment, each segment having a principal axis passing through said central point in the direction of greatest extension of the surface of the respective segment, said principal axis lying in a plane containing the X-axis and inclined to the Z-axis by an angle of substantially 23 degrees in the direction of parallelism with a major cap face.

5. A radiator in accordance with claim 4 in which the segments are equal spherical sectors.

6. A line focusing sound radiator comprising a mosaic cylindrical shell of piezoelectric quartz made up of a plurality of segments, each segment having a region extending in the direction of the cylindrical axis within which region the normal to the surface is substantially parallel to an X-axis of the mother crystal of the respective segment, the generatrix of each said segment being parallel to a YZ-plane of the mother crystal and perpendicular to a plane through the X-axis which plane is inclined to the Z-axis by an angle of substantially 23 degrees in the direction of parallelism with a major cap face.

7. A radiator in accordance with claim 6 in which the segments are equal in size and shape.

8. A curved focusing sound radiator comprising a mosaic of electric cut piezoelectric plates.

9. A focusing sound radiator having a spherical radiating surface and comprising a plurality of electric cut piezoelectric plates.

10. A focusing sound radiator having a cylindrical radiating surface and comprising a plurality of electric cut piezoelectric plates.

GERALD W. WILLARD.

REFERENCES CITED

The following references are of record in the file of this patent:

UNITED STATES PATENTS

| Number | Name | Date |
| --- | --- | --- |
| 2,248,870 | Langevin | July 8, 1941 |
| 2,323,030 | Gruetzmacher | June 29, 1943 |
| 2,374,637 | Hayes | Apr. 24, 1945 |
| 2,399,820 | Morgan | May 7, 1946 |
| 2,438,936 | Mason | Apr. 6, 1948 |
| 2,447,061 | Franklin | Aug. 17, 1948 |

FOREIGN PATENTS

| Number | Country | Date |
| --- | --- | --- |
| 654 673 | Germany | Dec. 24, 1937 |